(12) United States Patent
Takemoto et al.

(10) Patent No.: US 9,656,339 B2
(45) Date of Patent: May 23, 2017

(54) WIRE ELECTRIC DISCHARGE MACHINE AND MACHINING PASS GENERATING APPARATUS FOR WIRE ELECTRIC DISCHARGE MACHINE

(71) Applicant: FANUC Corporation, Yamanashi (JP)

(72) Inventors: Masanobu Takemoto, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 200 days.

(21) Appl. No.: 14/583,189

(22) Filed: Dec. 25, 2014

(65) Prior Publication Data

US 2015/0183038 A1    Jul. 2, 2015

(30) Foreign Application Priority Data

Dec. 26, 2013  (JP) ................................. 2013-269763

(51) Int. Cl.
*B23H 7/06* (2006.01)
*B23H 7/20* (2006.01)
*B23H 1/02* (2006.01)
*B23H 9/00* (2006.01)

(52) U.S. Cl.
CPC ............... *B23H 7/065* (2013.01); *B23H 1/02* (2013.01); *B23H 7/06* (2013.01); *B23H 7/20* (2013.01); *B23H 9/00* (2013.01); *G05B 2219/45221* (2013.01)

(58) Field of Classification Search
CPC . B23H 7/06; B23H 7/065; B23H 1/02; B23H 7/32; B23H 2600/10; B23H 26/12; B23H 7/20; G05B 2219/45221
See application file for complete search history.

(56) References Cited

U.S. PATENT DOCUMENTS

| | | | |
|---|---|---|---|
| 4,673,787 A * | 6/1987 | Inoue | B23H 7/065 |
| | | | 219/69.12 |
| 5,041,984 A * | 8/1991 | Watanabe | B23H 7/065 |
| | | | 219/69.17 |
| 5,047,606 A * | 9/1991 | Hiramine | B23H 7/065 |
| | | | 219/69.12 |

(Continued)

FOREIGN PATENT DOCUMENTS

| | | |
|---|---|---|
| CN | 1792543 A | 6/2006 |
| CN | 102328122 A | 1/2012 |

(Continued)

OTHER PUBLICATIONS

Office Action mailed Apr. 7, 2015, corresponding to Japanese patent application No. 2013-269763.

(Continued)

*Primary Examiner* — Geoffrey S Evans
(74) *Attorney, Agent, or Firm* — Hauptman Ham, LLP

(57) ABSTRACT

A machining pass generating apparatus for a wire electric discharge machine, which is configured to generate a machining pass for machining a key groove on a side surface of a round hole, includes a processor. The processor is configured to define a shape of the key groove to be machined, designate a diameter of the round hole, designate a position of the round hole, and generate a machining pass, the pass suppresses an opening of the key groove from being narrowed.

8 Claims, 16 Drawing Sheets

(56) References Cited

U.S. PATENT DOCUMENTS

| | | | | |
|---|---|---|---|---|
| 5,083,000 | A | * | 1/1992 | Sakaue ............ B23H 7/065 219/69.12 |
| 5,357,072 | A | | 10/1994 | Garwick |
| 5,761,068 | A | | 6/1998 | Nakata |
| 2014/0175063 | A1 | * | 6/2014 | Niu .................. B23H 7/065 219/69.12 |
| 2015/0183039 | A1 | * | 7/2015 | Irie .................. B23H 7/065 219/69.12 |
| 2015/0367436 | A1 | * | 12/2015 | Hiraga ............... B23H 7/06 700/162 |
| 2016/0107251 | A1 | * | 4/2016 | Takemoto ........... B23H 7/06 700/162 |

FOREIGN PATENT DOCUMENTS

| | | |
|---|---|---|
| CN | 102642043 A | 8/2012 |
| CN | 102909400 A | 2/2013 |
| EP | 2133167 A2 | 12/2009 |
| JP | 03-26419 A * | 2/1991 |
| JP | 8-153132 A | 6/1996 |
| JP | 8-300223 A | 11/1996 |
| JP | 9-6424 A | 1/1997 |
| JP | 2007-307661 A | 11/2007 |
| JP | 2009-285743 A | 12/2009 |
| JP | 2010-23138 A | 2/2010 |
| JP | 2010-99824 A | 5/2010 |

OTHER PUBLICATIONS

Extended European Search Report dated Jul. 30, 2015, corresponding to European patent application No. 14194400.9.
Decision to Grant a Patent mailed Sep. 1, 2015, corresponding to Japanese Patent Application No. 2013-269763.
Office Action in CN Application No. 201410816999.7, dated Oct. 10, 2016.

* cited by examiner

FIG.7B

```
O0001
#101=10.0                            KEY GROOVE WIDTH(W)
#102=20.0                            KEY GROOVE DEPTH(T)
#103=50.0/2                          HALF OF HOLE DIAMETER (D): RADIUS
#104=-100.0                          CENTER COORDINATE(X)
#105=-100.0                          CENTER COORDINATE(Y)
G00 G90 G53 X#104 Y#105              MOVE TO HOLE CENTER POSITION
#5201=0.0                            DESIGNATE ROTATION ANGLE (A) OF PASS
G92 X0 Y0                            SET PRESENT POSITION AS PROGRAM ORIGIN
S1 D1                                DETERMINE MACHINING CONDITION AND OFFSET
G00 G91 X-[#101/2-2.5] Y[#103-5.0]   QUICKLY MOVE TO NEAR KEY GROOVE CUTTING PORTION ON KEY GROOVE LEFT SIDE SURFACE
G01 G42 X-2.5 Y2.5                   MOVE WHILE OFFSETTING TO FRONT OF CUTTING PORTION
Y[#102+2.5]                          MACHINE KEY GROOVE LEFT SIDE SURFACE
X#101                                MACHINE KEY GROOVE BOTTOM
Y-[#102+2.5]                         MACHINE KEY GROOVE RIGHT SIDE SURFACE
G 40X-2.5  Y-2.5                     MOVE WHILE CANCELLING OFFSET
G00 G90 X0 Y0                        RETURN TO PROGRAM ORIGIN
M30                                  END PROGRAM
```

FIG.7C

```
O0001
#101=10.0                                KEY GROOVE WIDTH(W)
#102=20.0                                KEY GROOVE DEPTH(T)
#103=50.0/2                              HALF OF HOLE DIAMETER (D): RADIUS
#104=-100.0                              CENTER COORDINATE(X)
#105=-100.0                              CENTER COORDINATE(Y)
#106=1.0                                 SURFACE C
G00 G90 G53 X#104 Y#105                  MOVE TO HOLE CENTER POSITION
#5201=0.0                                DESIGNATE ROTATION ANGLE (A) OF PASS
G92 X0 Y0                                SET PRESENT POSITION AS PROGRAM ORIGIN
S1 D1                                    DETERMINE MACHINING CONDITION AND OFFSET
G00 G91 X-[#101/2-2.5] Y[#103-5.0]       QUICKLY MOVE TO NEAR CUTTING PORTION ON KEY GROOVE LEFT SIDE SURFACE SIDE
G01 G42 X-2.5 Y2.5                       MOVE WHILE OFFSETTING TO FRONT OF CUTTING PORTION
Y[#102+2.5]                              MACHINE KEY GROOVE LEFT SIDE SURFACE
X#101                                    MACHINE KEY GROOVE BOTTOM
Y-[#102+2.5]                             MACHINE KEY GROOVE RIGHT SIDE SURFACE
G40 X-2.5 Y-2.5                          MOVE WHILE CANCELLING OFFSET
G00 G90 X0 Y0                            RETURN TO PROGRAM ORIGIN
G00 G91 X-[#101/2-2.5] Y[#103-2.5]       QUICKLY MOVE TO NEAR CUTTING PORTION ON KEY GROOVE LEFT SIDE SURFACE SIDE
G01 G42 X[-2.5-#106-1.0] Y[2.5-1.0]      MOVE TO SURFACE C MACHINING START POSITION
X[#106+1.0+1.0] Y[#106+1.0+1.0]          MACHINE SURFACE C ON KEY GROOVE LEFT SIDE SURFACE
G40 Y-1.0                                MOVE WHILE CANCELLING OFFSET
G00 G90 X0 Y0                            RETURN TO PROGRAM ORIGIN
G00 G91 X[#101/2-2.5] Y[#103-2.5]        QUICKLY MOVE TO NEAR CUTTING PORTION ON KEY GROOVE RIGHT SIDE SURFACE
G01 G41 X[2.5+#106+1.0] Y[2.5-1.0]       MOVE TO SURFACE C MACHINING START POSITION
X-[#106+1.0+1.0] Y[#106+1.0+1.0]         MACHINE SURFACE C ON KEY GROOVE LEFT SIDE SURFACE
G40 Y-1.0                                MOVE WHILE CANCELLING OFFSET
G00 G90 X0 Y0                            RETURN TO PROGRAM ORIGIN
M30                                      END PROGRAM
```

FIG.7D

```
O0001
#101=10.0                              KEY GROOVE WIDTH(W)
#102=20.0                              KEY GROOVE DEPTH(T)
#103=50.0/2                            HALF OF HOLE DIAMETER (D): RADIUS
#104=-100.0                            CENTER COORDINATE(X)
#105=-100.0                            CENTER COORDINATE(Y)
G00 G90 G53 X#104 Y#105                MOVE TO HOLE CENTER POSITION
#5201=0.0                              DESIGNATE ROTATION ANGLE (A) OF PASS
G92 X0 Y0                              SET PRESENT POSITION AS PROGRAM ORIGIN
S1 D1                                  DETERMINE MACHINING CONDITION AND OFFSET
G00 G91 X-[#101/2-2.5] Y[#103-5.0]     QUICKLY MOVE TO NEAR KEY GROOVE CUTTING PORTION ON KEY GROOVE LEFT SIDE SURFACE
G01 G42 X-2.5 Y2.5                     MOVE WHILE OFFSETTING TO FRONT OF CUTTING PORTION
Y[#102+2.5]                            MACHINE KEY GROOVE LEFT SIDE SURFACE
X#101                                  MACHINE KEY GROOVE BOTTOM
Y-[#102+2.5]                           MACHINE KEY GROOVE RIGHT SIDE SURFACE
G40 X-2.5 Y-2.5                        MOVE WHILE CANCELLING OFFSET
G00 G90 X0 Y0                          RETURN TO PROGRAM ORIGIN
S2 D2                                  SWITCH MACHINING CONDITION AND OFFSET
G00 G91 X-[#101/2-2.5] Y[#103-5.0]     QUICKLY MOVE TO NEAR KEY GROOVE CUTTING PORTION ON KEY GROOVE LEFT SIDE SURFACE
G01 G42 X-2.5 Y2.5                     MOVE WHILE OFFSETTING TO FRONT OF CUTTING PORTION
Y[#102+2.5]                            MACHINE KEY GROOVE LEFT SIDE SURFACE
X#101                                  MACHINE KEY GROOVE BOTTOM
Y-[#102+2.5]                           MACHINE KEY GROOVE RIGHT SIDE SURFACE
G40 X-2.5 Y-2.5                        MOVE WHILE CANCELLING OFFSET
G00 G90 X0 Y0                          RETURN TO PROGRAM ORIGIN
M30                                    END PROGRAM
```

X:CENTER X    Y:CENTER Y    W:KEY GROOVE    T:KEY GROOVE   D:HOLE      A:ANGLE   S:MACHINING            M:MACHINING MODE
COORDINATE    COORDINATE    WIDTH           DEPTH          DIAMETER              CONDITION NUMBER
```

FIG.9B

```
O0001(MAIN)
G92 X0 Y0                                          SET PRESENT POSITION AS PROGRAM ORIGIN
G123 X-100.0 Y-100.0 W10.0 T20.0 D50.0 A0.0 S1 M1  PERFORM KEY GROOVE MACHINING
M30                                                END PROGRAM
```

FIG.9C

```
O0100(G123 MACRO)
G00 G90 G53 X#24 Y#25                        MOVE TO HOLE CENTER POSITION (ARGUMENT X:#24, Y:#25)
#5201=#1                                      ROTATION ANGLE (ARGUMENT A:#1)
G92 X0 Y0                                     SET PRESENT POSITION AS PROGRAM ORIGIN
S#19 D#19                                     DETERMINE MACHINING CONDITION AND OFFSET

IF [#13 EQ1] GOTO 1100                        IF ARGUMENT M(#13)=1, JUMP TO N1100
IF [#13 EQ2] GOTO 1200                        IF ARGUMENT M(#13)=2, JUMP TO N1200
IF [#13 EQ3] GOTO 1300                        IF ARGUMENT M(#13)=3, JUMP TO N1300
GOTO 1900                                     IF ARGUMENT M(#13) is OTHER NUMBERS, JUMP TO N1900

N1100 G65 P1100 W#23 T#20 D#7                 CALL O1100
GOTO 9999                                     JUMP TO N9999

N1200 G65 P1200 W#23 T#20 D#7                 CALL O1200
GOTO 9999                                     JUMP TO N9999

N1300 G65 P1300 W#23 T#20 D#7                 CALL O1300
G00 G90 X0 Y0                                 RETURN TO PROGRAM ORIGIN
S[#19+1] D[#19+1]                             SWITCH MACHINING CONDITION AND OFFSET
N1300 G65 P1300 W#23 T#20 D#7                 CALL O1300
GOTO 9999                                     JUMP TO N9999

N1900 G65 P1900 W#23 T#20 D#7                 CALL O1900
GOTO 9999                                     JUMP TO N9999

N9999
G00 G90 X0 Y0                                 RETURN TO PROGRAM ORIGIN
M99                                           RETURN TO MAIN PROGRAM
```

FIG.9D

```
O1100
G00 G91 Y[#7/2-5.0]         QUICKLY MOVE TO NEAR KEY GROOVE CUTTING PORTION IN KEY GROOVE CENTER (ARGUMENT D:#7)
G01 G41 Y[#20+5.0]          MACHINE TO KEY GROOVE BOTTOM (ARGUMENT T:#20)
X-[#23/2]                   MACHINE LEFT HALF OF KEY GROOVE BOTTOM (ARGUMENT W:#23)
Y-[#20+5.0]                 MACHINE KEY GROOVE LEFT SIDE SURFACE
G40 X[#23/2]                RETURN TO KEY GROOVE CENTER
G01 G42 Y[#20+5.0]          MACHINE TO KEY GROOVE BOTTOM
X[#23/2]                    MACHINE RIGHT HALF OF KEY GROOVE BOTTOM
Y-[#20+5.0]                 MACHINE KEY GROOVE SIDE SURFACE RIGHT SIDE
G40 -X[#23/2]               RETURN TO KEY GROOVE CENTER
M99                         RETURN TO CALL SOURCE PROGRAM
```

FIG.9E

```
O1200
#106=1.0                                              SURFACE C

G00 G91 X-[#23/2-2.5] Y[#7/2-5.0]    QUICKLY MOVE TO NEAR KEY GROOVE CUTTING PORTION ON KEY GROOVE LEFT SIDE SURFACE (ARGUMENT D:#7, W:#23)
G01 G42 X-2.5 Y2.5                   MOVE WHILE OFFSETTING TO FRONT OF CUTTING PORTION
Y[#20+2.5]                           MACHINE KEY GROOVE LEFT SIDE SURFACE (ARGUMENT T:#20)
X#23                                 MACHINE KEY GROOVE BOTTOM
Y-[#20+2.5]                          MACHINE KEY GROOVE RIGHT SIDE SURFACE
G40 X-2.5 Y-2.5                      MOVE WHILE CANCELLING OFFSET
G00 G90 X0 Y0                        RETURN TO PROGRAM ORIGIN
G00 G91 X-[#23/2-2.5] Y[#7/2-2.5]    QUICKLY MOVE TO NEAR KEY GROOVE CUTTING PORTION ON KEY GROOVE LEFT SIDE SURFACE
G01 G42 X[-2.5-#106-1.0] Y[2.5-1.0]  MOVE TO SURFACE C MACHINING START POSITION
X[#106+1.0+1.0] Y[#106+1.0+1.0]      MACHINE SURFACE C ON KEY GROOVE LEFT SIDE SURFACE
G40 Y-1.0                            MOVE WHILE CANCELLING OFFSET
G00 G90 X0 Y0                        RETURN TO PROGRAM ORIGIN
G00 G91 X[#23/2-2.5] Y[#7/2-2.5]     QUICKLY MOVE TO NEAR KEY GROOVE CUTTING PORTION ON KEY GROOVE RIGHT SIDE SURFACE
G01 G41 X[2.5+#106+1.0] Y[2.5-1.0]   MOVE TO SURFACE C MACHINING START POSITION
X-[#106+1.0+1.0] Y[#106+1.0+1.0]     MACHINE SURFACE C ON KEY GROOVE RIGHT SIDE SURFACE
G40 Y-1.0                            MOVE WHILE CANCELLING OFFSET
G00 G90 X0 Y0                        RETURN TO PROGRAM ORIGIN
M30                                  END PROGRAM
```

FIG.9F

```
O1300
G00 G91 X-[#23/2-2.5] Y[#7-5.0]     QUICKLY MOVE TO NEAR KEY GROOVE CUTTING PORTION ON KEY GROOVE LEFT SIDE SURFACE (ARGUMENT D:#7, W:#23)
G01 G42 X-2.5 Y2.5                  MOVE WHILE OFFSETTING TO FRONT OF CUTTING PORTION
Y[#20+2.5]                          MACHINE KEY GROOVE LEFT SIDE SURFACE (ARGUMENT T:#20)
X#23                                MACHINE KEY GROOVE BOTTOM
Y-[#20+2.5]                         MACHINE KEY GROOVE RIGHT SIDE SURFACE
G40 X-2.5 Y-2.5                     MOVE WHILE CANCELLING OFFSET
M99                                 END PROGRAM
```

FIG.9G

```
O1900
G00 G91 X-[#23/2-2.5] Y[#7/2-5.0]   QUICKLY MOVE TO NEAR KEY GROOVE CUTTING PORTION ON KEY GROOVE LEFT SIDE SURFACE (ARGUMENT D:#7, W:#23)
G01 G42 X-2.5 Y2.5                  MOVE WHILE OFFSETTING TO FRONT OF CUTTING PORTION
Y[#20+2.5]                          MACHINE KEY GROOVE LEFT SIDE SURFACE (ARGUMENT T:#20)
X#23                                MACHINE KEY GROOVE BOTTOM
Y-[#20+2.5]                         MACHINE KEY GROOVE RIGHT SIDE SURFACE
G40 X-2.5 Y-2.5                     MOVE WHILE CANCELLING OFFSET
M99                                 END PROGRAM
```

WIRE ELECTRIC DISCHARGE MACHINE AND MACHINING PASS GENERATING APPARATUS FOR WIRE ELECTRIC DISCHARGE MACHINE

RELATED APPLICATIONS

The present application claims priority to Japanese Application Number 2013-269763, filed Dec. 26, 2013, the disclosure of which is hereby incorporated by reference herein in its entirety.

BACKGROUND OF THE INVENTION

1. Field of the Invention

The present invention relates to a key groove machining pass generating apparatus for a wire electric discharge machine.

2. Description of the Related Art

Japanese Patent Laid-Open No. 8-153132 discloses a CAD/CAM apparatus with which an operator can automatically draw a figure, generate data of key groove machining, and generate NC data simply by selecting defined holes and inputting parameters concerning a key and a key groove shape.

The apparatus disclosed in Japanese Patent Laid-Open No. 8-153132 can generate NC data for key groove machining by including a key groove defining unit and a key groove database registering unit. However, the apparatus is configured to generate the NC data without taking into account a problem that occurs when wire electric discharge machining is applied to an arcuate surface to be machined. Therefore, a key sometimes does not enter a key groove.

A problem that occurs when a workpiece is cut in wire electric discharge machining is explained with reference to FIGS. 10 and 11. FIG. 10 is a diagram showing a state in which a wire electrode 2 receives a force in a direction opposite to a wire traveling direction 6 if a surface to be machined 4a and a machining pass 8 are orthogonal to each other when a workpiece 4 is cut in the wire electric discharge machining. FIG. 11 is a diagram showing a state in which the wire electrode 2 deviates from the machining pass 8 if the surface to be machined 4a and the machining pass 8 are not orthogonal to each other when the workpiece 4 is cut in the wire electric discharge machining. Note that reference numeral 10 denotes electric discharge.

As shown in FIG. 10, when the wire electrode 2 is cut into the workpiece 4 in the wire electric discharge machining, if the surface to be machined 4a and the machining pass 8 are orthogonal to each other, a discharge repulsive force generated in the wire electrode 2 and a force 12 received from machining liquid by the wire electrode 2 work in a direction opposite to a traveling direction of the wire electrode 2 along the machining pass 8.

However, as shown in FIG. 11, if the surface to be machined 4a and the machining pass 8 are not orthogonal to each other, the two forces 12 work to move away from the machining pass 8 according to an angle formed by the surface to be machined 4a and the machining pass 8. The wire electrode 2 deviates from the machining pass 8 with the forces, which is problematic. Consequently, this causes a problem that when a key groove is machined, shape accuracy of an opening of the key groove is deteriorated, the dimensions of the opening decrease and a key cannot be inserted into the key groove.

FIG. 12 is a diagram for explaining a conventional machining method for machining a key groove in a round hole. When a key groove 16 is machined in a round hole 15 shown in FIG. 12, usually, a machining pass 18 indicated by a dotted line having a shortest machining distance is generated to perform the machining. When the machining is applied to a surface to be machined 14a of the round hole 15 on such a machining pass 18, since the surface to be machined 14a and the machining pass 18 are not orthogonal to each other, the forces explained above work on the wire electrode 2. The wire electrode 2 deviates from the machining pass 18 as indicated by an actual moving pass 20 of the wire electrode 2 shown in FIG. 13. As a result, a cutting portion of a key groove is formed in a machining shape like a part 24 shown in FIG. 14. A key groove opening is narrower than the width indicated in the drawings and the like. Therefore, a key 22 shown in FIG. 14 does not enter the machined key groove.

SUMMARY OF THE INVENTION

Therefore, in view of the problems of the related art, it is an object of the present invention to provide a wire electric discharge machine and a key groove machining pass generating apparatus for the wire electric discharge machine capable of generating a machining pass for avoiding a problem peculiar to wire electric discharge machining in that a key groove opening is narrowed when a machining pass for key groove machining is generated.

A machining pass generating apparatus for a wire electric discharge machine according to the present invention is a machining pass generating apparatus for a wire electric discharge machine that generates a machining pass for machining a key groove on a side surface of a round hole. The machining pass generating apparatus includes: a key groove defining unit configured to define a shape of the key groove to be machined; a hole diameter designating unit configured to designate a diameter of the round hole; a hole position designating unit configured to designate a position of the round hole; and a machining pass generating unit configured to generate a machining pass for suppressing an opening of the key groove from being narrowed. A wire electric discharge machine according to the present invention may generate a machining pass for machining a key groove on a side surface of a round hole. The wire electric discharge machine may include: a key groove defining unit configured to define a shape of the key groove to be machined; a hole diameter designating unit configured to designate a diameter of the round hole; a hole position designating unit configured to designate a position of the round hole; and a machining pass generating unit configured to generate a machining pass for suppressing an opening of the key groove from being narrowed.

The machining pass generating unit may generate a machining pass for machining side surfaces of the key groove such that, on both the side surfaces, a wire electrode moves from a bottom to the opening of the key groove.

The machining pass generating unit may generate a chamfered section or a corner R section in the opening of the key groove.

The machining pass generating unit may set the machining pass for machining the side surfaces of the key groove in a direction in which the wire electrode moves from the opening to the bottom of the key groove and repeatedly generate a pass the same as a pass once machined or repeatedly generate a pass shifted in an offset direction of the wire electrode.

By including the configurations explained above, the present invention can provide a wire electric discharge machine and a key groove machining pass generating apparatus for the wire electric discharge machine capable of generating a machining pass for avoiding a problem peculiar to wire electric discharge machining in that a key groove opening is narrowed when a machining pass for key groove machining is generated.

BRIEF DESCRIPTION OF THE DRAWINGS

The objects and the characteristics explained above and other objects and characteristics of the present invention will become apparent from embodiments explained with reference to the accompanying drawings, among the drawings:

FIG. 7B is a diagram showing a program example executed when all of (1) to (3) are not checked in FIG. 6;

FIG. 7C is a diagram showing a program example executed when only (2) is checked in FIG. 6;

FIG. 7D is a diagram showing a program example executed when only (3) is checked in FIG. 6;

FIG. 9A is a diagram showing an example of a format commanded to a program when a key groove machining program is generated by a macro program;

FIG. 9B is a diagram showing an example of the key groove machining program;

FIG. 9C is an example of a program (O100) executed when G123 is commanded;

FIG. 9D is a diagram showing an example of a program for machining a key groove side surface from a bottom to an opening of a key groove;

FIG. 9E is a diagram showing an example of a program for machining the key groove opening to be chamfered;

FIG. 9F is a diagram showing an example of a program for performing finishing for performing machining, with machining conditions changed, on the same pass again or on a pass shifted in an offset direction of a wire electrode after machining;

FIG. 9G is a diagram showing an example of a program for performing machining with a shortest machining distance when an unspecified machining mode is designated as an argument M;

DETAILED DESCRIPTION OF THE PREFERRED EMBODIMENTS

Machining Method 1

Figure 1:
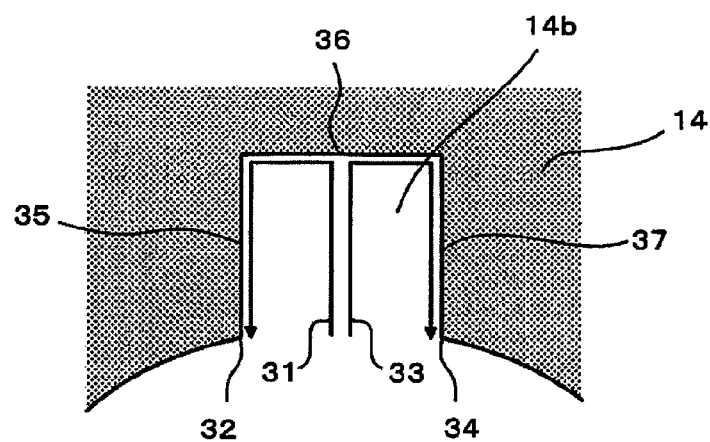
FIG. 1 is a diagram showing a machining method 1 according to an embodiment of the present invention.

A machining method 1 in an embodiment of the present invention is explained with reference to FIG. 1. A key groove 14b is cut in the center along a machining pass 31 and machined to a bottom of the key groove 14b, that is, a key groove bottom surface 36. When the machining reaches the bottom of the key groove 14b, that is, the key groove bottom surface 36, the key groove bottom surface 36 is machined in the paper surface left direction. When the machining reaches a key groove side surface 35, the key groove side surface 35 is machined toward an opening, that is, a key groove opening 32. Subsequently, the key groove 14b is cut in the center along a machining pass 33 to be machined to the bottom of the key groove 14b, that is, the key groove bottom surface 36. When the machining reaches the bottom of the key groove 14b, that is, the key groove bottom surface 36, the key groove bottom surface 36 is machined to the right in the figure. When the machining reaches a key groove side surface 37, the key groove side surface 37 is machined toward the opening, that is, a key groove opening 34.

In the machining method 1, a wire electrode 2 is in a workpiece 14 when a key groove opening is machined. Distances between the wire electrode 2 and the workpiece 14 on the left and right are the same. Therefore, a slanted flow of water does not occur. As a result, the wire electrode 2 can machine a pass as commanded. It is possible to suppress the opening of the key groove 14b from being narrowed. Even if a machining pass of the wire electrode 2 slants in a cutting portion, since the portion is an unnecessary portion (a core) for a product, the portion does not affect a finished workpiece.

Machining Method 2

Figure 2:
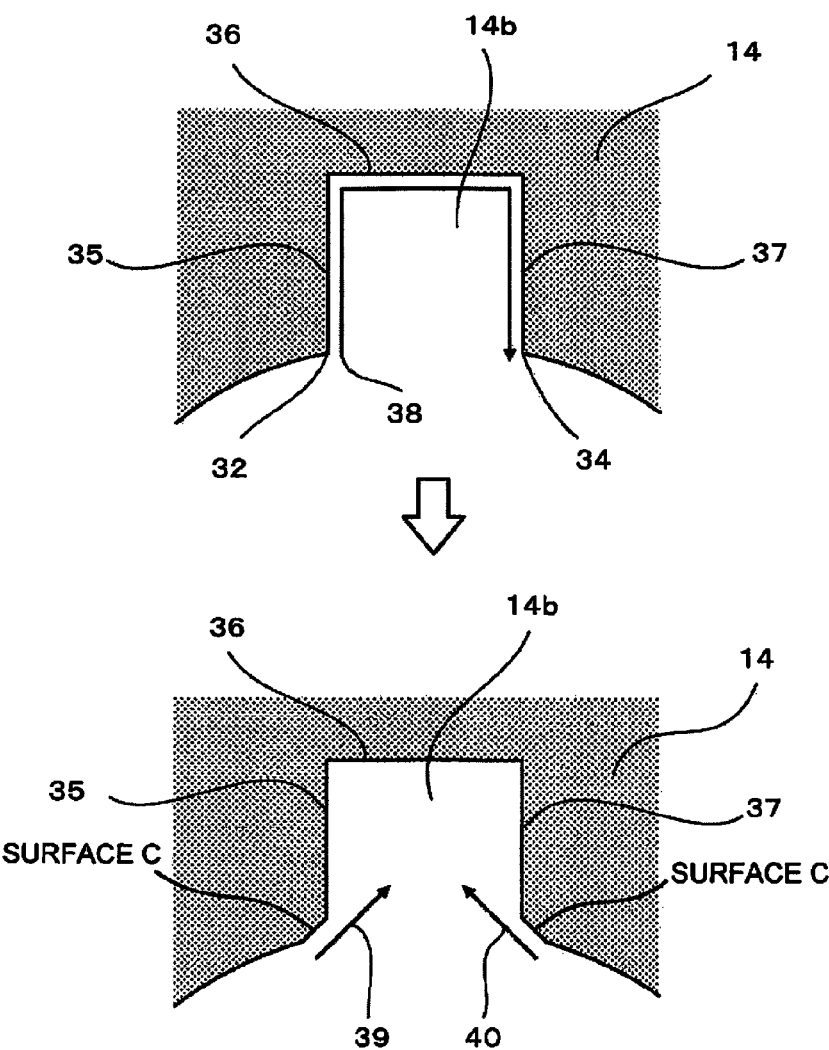
FIG. 2 is a diagram showing a machining method 2.

A machining method 2 is explained with reference to FIG. 2. First, as shown in an upper figure of FIG. 2, machining is performed on a normal pass, that is, a machining pass 38 with a shortest machining distance. Thereafter, as shown in a lower diagram of FIG. 2, chamfer sections or corner R sections are machined in a key groove opening. As a result, a narrowed key groove opening is cut off by the machining of the chamfer sections or the corner R sections.

Machining Method 3

Figure 3:
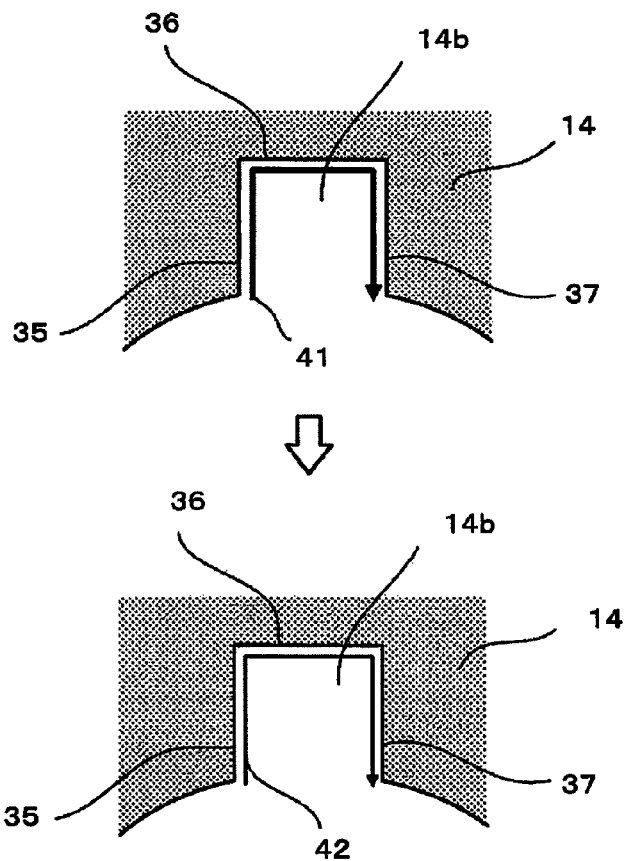
FIG. 3 is a diagram showing a machining method 3.

A machining method 3 is explained with reference to FIG. 3. First, machining is performed on a normal pass, that is, a pass for rough machining 41 with a shortest machining distance. Thereafter, machining is performed with machining conditions changed on the same pass again or on a machining pass shifted in an offset direction. Usually, in the second or subsequent machining (finishing 42), an ejection amount of machining liquid per unit time is small compared with first machining (the rough machining 41). This is because, in the finishing, since a machined groove formed by the rough machining is traced to be machined, a machining amount of the workpiece 14 is small and a large ejection amount of the machining liquid is unnecessary. Therefore, when a key groove opening is machined by finishing, deviation of the wire electrode 2 in the center direction of a circle is suppressed with respect to a commanded pass. A portion that narrows the key groove opening is machined. As a result, the dimensions of the narrowed key groove opening are corrected.

In order to accurately machine a key groove in a round hole, it is necessary to create a machining pass to perform machining by any one or a plurality of the methods explained above. This requires experience of an operator, that is, a person who creates a machining pass, that is, a machining program.

A unit for designating a shape of a key groove to be machined is provided in a machining pass generating apparatus such as a numerical controller 50 (see FIG. 4) or a computer. The machining pass generating apparatus defines, as a machining pass for key groove machining, a machining pass to be generated. In the machining pass generating apparatus, a unit for designating a diameter of a round hole and a position of the round hole is provided. The machining pass generating apparatus determines a machining position of the key groove, that is, a position in a machining area by the wire electric discharge machine. The machining pass generating apparatus generates a machining pass from the designated shape of the key groove and the designated diameter and the designated position of the round hole. The machining pass generated in this case is defined in advance as a machining pass for key groove machining. Therefore, the machining pass generating apparatus can perform processing exclusive for key groove machining and can generate a machining pass for suppressing a key groove opening from being narrowed.

When performing the processing exclusive for key groove machining, as in the machining method 1 shown in FIG. 1, on machining side surfaces of the key groove, by generating a machining pass such that the wire electrode 2 moves from the bottom to the opening of the key groove on both side surfaces, the machining pass generating apparatus can suppress the key groove opening from being narrowed. As in the machining method 2 shown in FIG. 2, when performing the processing exclusive for key groove machining, by generating chamfered sections or corner R sections in the key groove opening, the machining pass generating apparatus can suppress the key groove opening from being narrowed. As in the machining method 3 shown in FIG. 3, when performing the processing exclusive for key groove machining, by repeatedly generating a pass the same as a pass once machined or repeatedly generating a pass shifted in an offset direction of the wire electrode 2, the machining pass generating apparatus can suppress the key groove opening from being narrowed.

Figure 4:
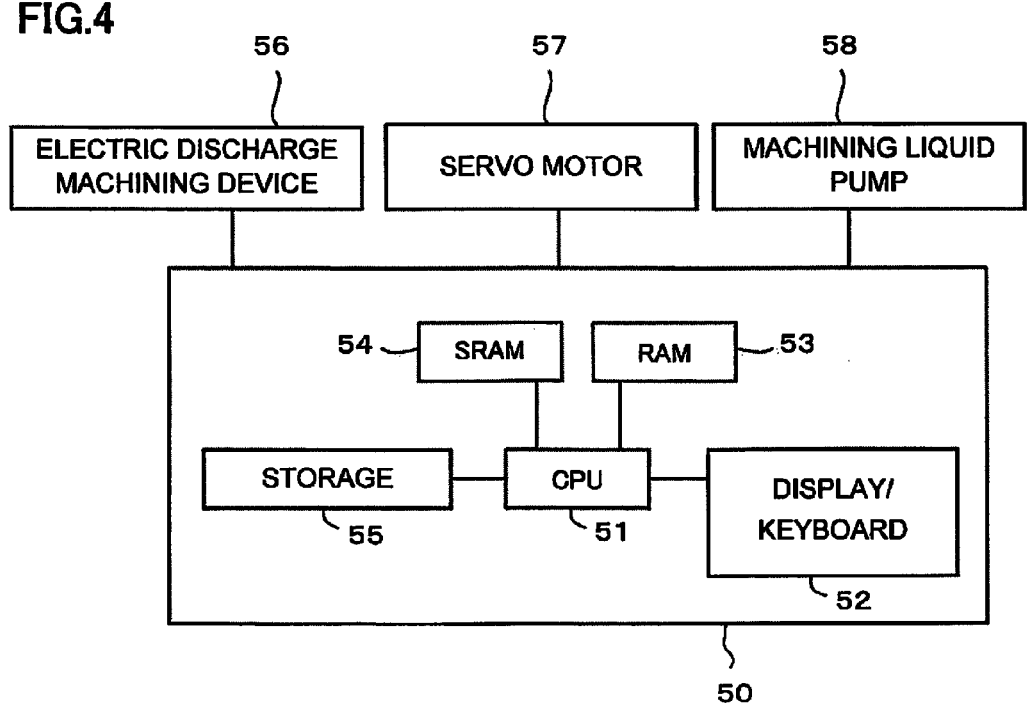
FIG. 4 is a block diagram showing a wire electric discharge machine.

FIG. 4 is a block diagram showing a wire electric discharge machine that executes the machining methods 1 to 3. In this embodiment, a machining pass generating unit is mounted on the numerical controller 50 mounted on the wire electric discharge machine. The numerical controller 50 of the wire electric discharge machine, which is a machining pass generating apparatus, generates a key groove machining program on the basis of data input from a display/keyboard.

The wire electric discharge machine includes a discharging device 56 that applies a voltage and supplies an electric current to between the wire electrode 2 and an electrode of the workpiece 14, a servo motor 57 that drives shafts of the wire electric discharge machine, a machining liquid pump 58 for supplying machining liquid to an electric discharge machining portion, and the numerical controller 50 that controls the entire wire electric discharge machine. The numerical controller 50 includes a CPU 51, a display/keyboard 52, a RAM 53, an SRAM 54, and a storage 55. Note that the display/keyboard 52 is configured from a display and a keyboard.

A shape of a key groove, a diameter of a round hole, and a position of the round hole input from the display/keyboard 52 is stored in the storage 55 or the SRAM 54. The machining pass generating unit, that is, software for generating a machining pass is registered in the storage 55. The machining pass generating unit is copied to the RAM 53 after a power supply of the numerical controller 50 is turned on. The machining pass generating unit is executed using the CPU 51. A generated machining program is stored in the storage 55 or the SRAM 54.

When the generated machining program is executed, the CPU 51 analyzes the machining program and issues commands to the discharging device 56, the servo motor 57, and the machining liquid pump 58. The discharging device 56, the servo motor 57, and the machining liquid pump 58 operate on the basis of the commands. The wire electric discharge machine moves the wire electrode 2, which discharges electricity, while feeding the machining liquid and machines a workpiece. Note that a machining pass creating apparatus is formed by causing a storage unit of the numerical controller 50 to store the machining pass generating unit, that is, the software for generating a machining pass. A machining pass of the wire electric discharge machine can be created by mounting the machining pass generating unit, that is, the software for generating a machining pass on a personal computer instead of storing the machining pass generating unit in the storage unit.

Figure 5:
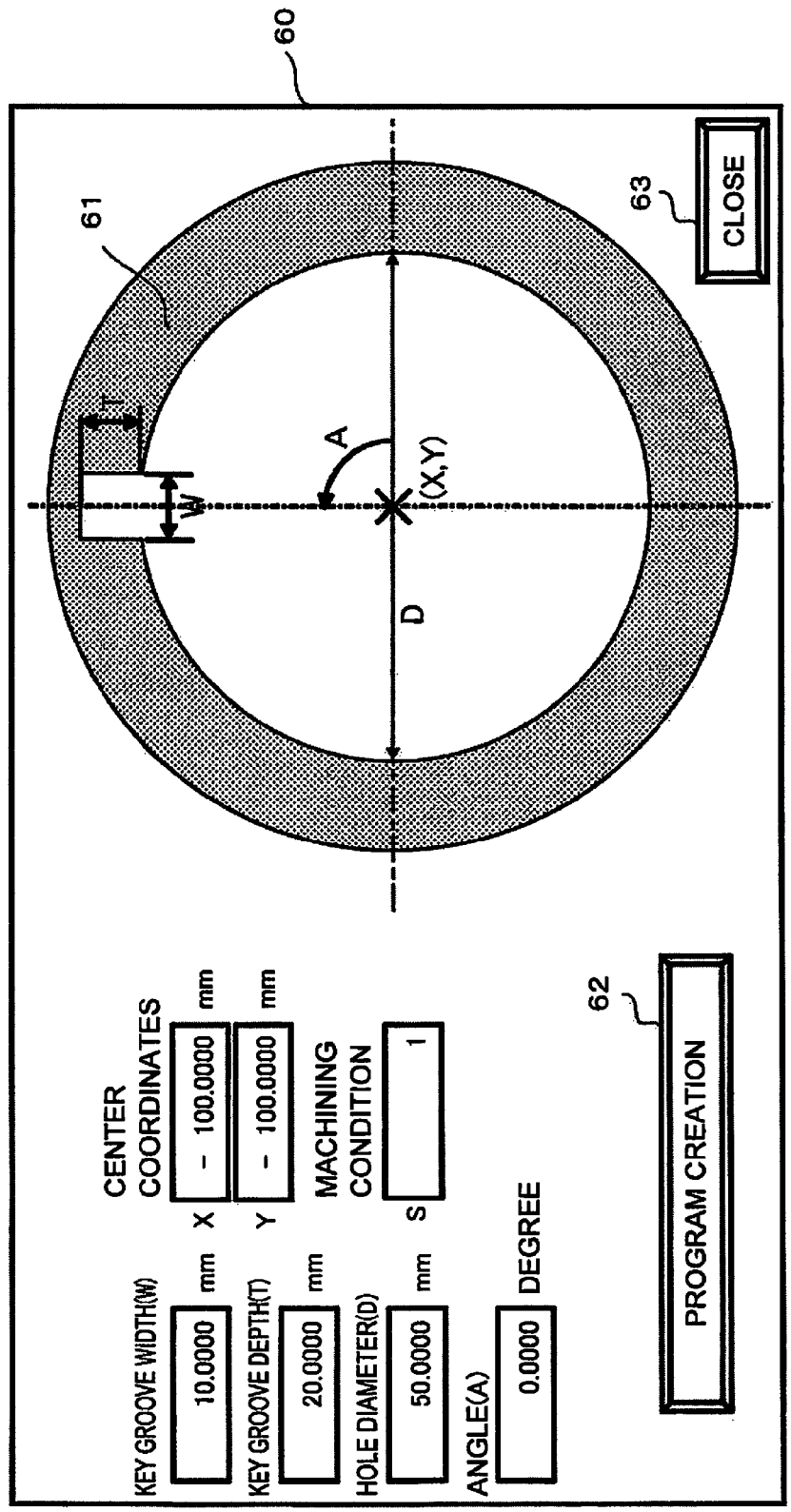
FIG. 5 is a screen for creating a key groove machining program in a numerical controller.

FIG. 5 is a screen example 60 on which a key groove machining program is created in the numerical controller 50. The screen example 60 includes a workpiece image 61, an area where parameters for machining a key groove 14b such as a key groove width (W), center coordinates, a key groove depth (T), a hole diameter (D), an angle (A), and a machining condition are input, a program creation button 62 for commanding program creation, and a button 63 for closing the screen. When an operator inputs data and presses the program creation button 62, a machining program is created. When the operator presses the close button 63, the screen is closed and the creation of the key groove machining program is stopped.

On the screen example 60 shown in FIG. 5, first, the operator inputs the key groove width W and the key groove depth T to the screen in order to designate a key groove shape. Subsequently, the operator inputs the hole diameter D, the angle A, and center coordinates X and Y in order to designate a key groove position. Finally, the operator inputs a machining condition number to be used and presses the program creation button 62. For example, the machining pass generating apparatus such as the numerical controller 50 detects that the program creation button 62 is pressed and acquires values of data input on the screen. In this case, the machining pass generating apparatus recognizes that the key groove shape is included in the acquired data, displays a dialog screen 65, and causes the operator to select a unit for suppressing a key groove opening from being narrowed (see FIG. 6).

Figure 6:
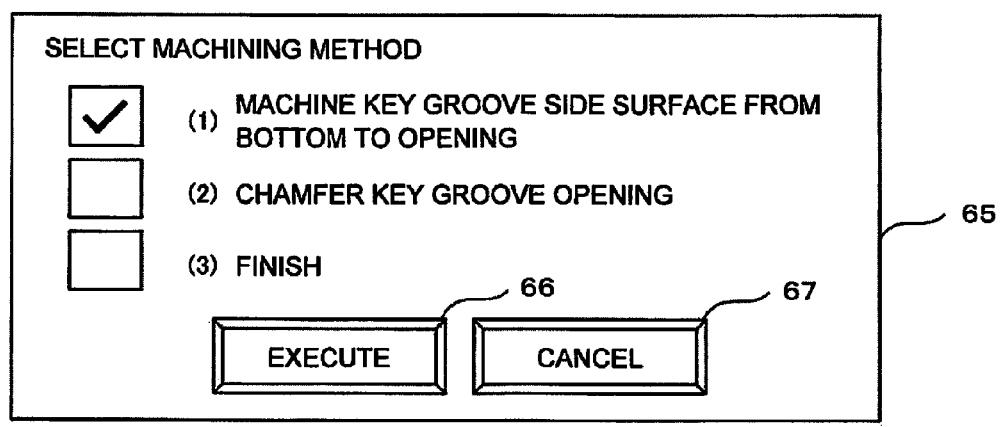
FIG. 6 is an example of a dialog screen for selecting a machining method for a key groove.

FIG. 6 is an example of a dialog screen for selecting a machining method for a key groove. The dialog screen 65 includes an execution button 66, a cancel button 67, and checkboxes for selecting (1) a machining method for machining a key groove side surface from a bottom to an opening of a key groove (see FIG. 1), (2) a machining method for chamfering the key groove opening (see FIG. 2), and (3) a machining method for performing finishing (see FIG. 3).

In a dialog shown in FIG. 6, the operator checks an item that the operator desires to execute and presses the execution button 66. When closing the dialog, that is, the dialog screen 65 and returning to the original screen, the operator presses the cancel button 67. When the execution button 66 is pressed, the machining pass generating apparatus creates a machining program. However, when (1) in FIG. 6 is checked in this case, the machining pass generating apparatus creates a program to machine a key groove surface from a bottom to an opening of a key groove as shown in FIG. 1.

Figure 7A:
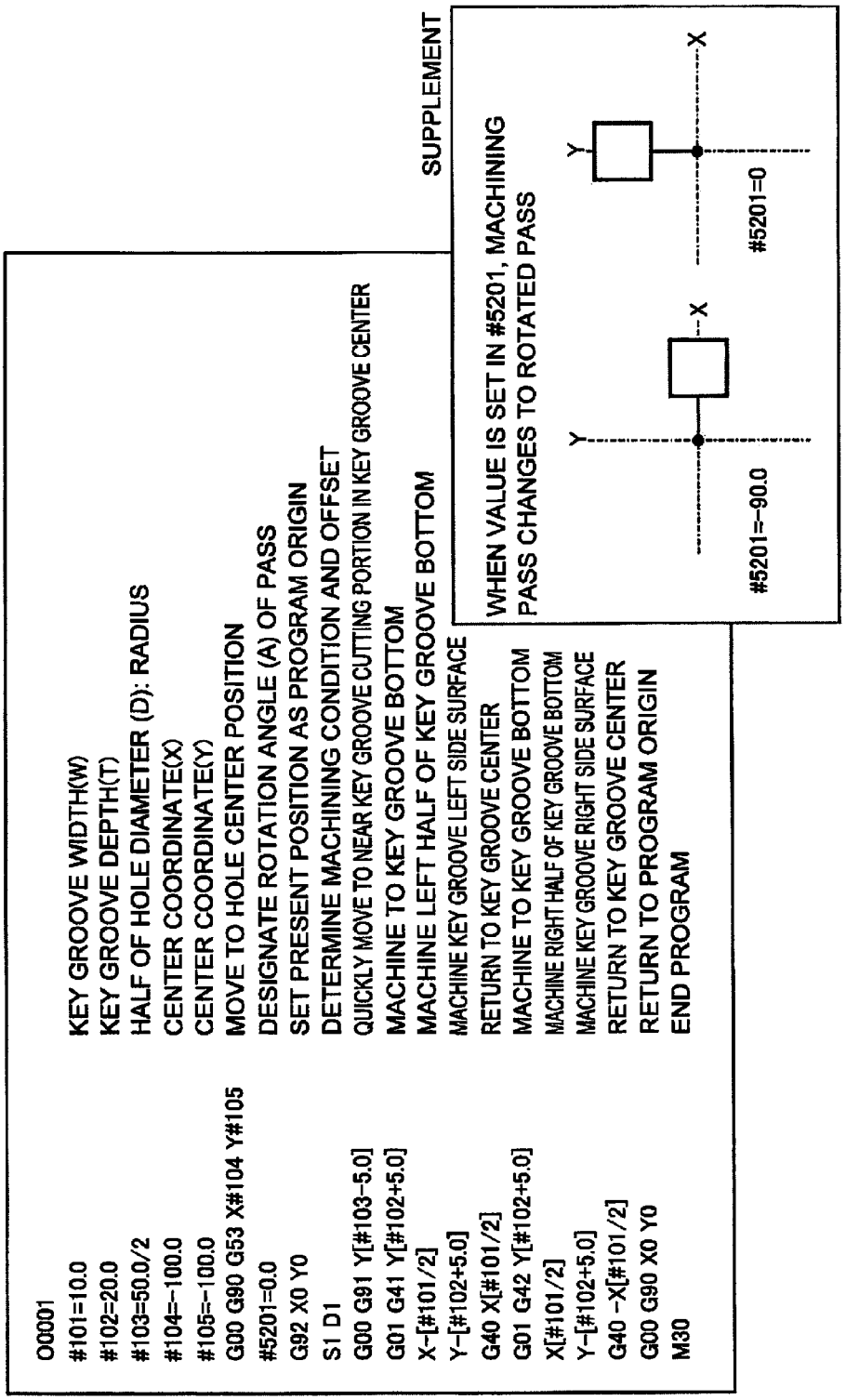
FIG. 7A is a diagram showing a program example executed when only (1) is checked in FIG. 6.

FIG. 7A is a program example executed when only (1) in FIG. 6 is checked. If (1) in FIG. 6 is not checked, the machining pass generating apparatus creates a program for performing machining like the rough machining shown in FIG. 3. FIG. 7B is a program example executed when all of (1) to (3) in FIG. 6 are not checked. If (2) in FIG. 6 is checked, the machining pass generating apparatus creates a machining program to chamfer the key groove opening as shown in FIG. 2. The chamfered sections shown in FIG. 2 may be corner R sections. FIG. 7C is a program example executed when only (2) in FIG. 6 is checked. If (3) in FIG. 6 is checked, the machining pass generating apparatus creates a program for performing finishing for performing machining, with machining conditions changed, on the same pass again or on a pass shifted in an offset direction of the wire electrode 2 after rough machining as shown in FIG. 3. FIG. 7D is a program example executed when only (3) in FIG. 6 is checked. A plurality of machining methods can be selected out of the machining methods (1) to (3) shown in FIG. 6.

Figure 8:
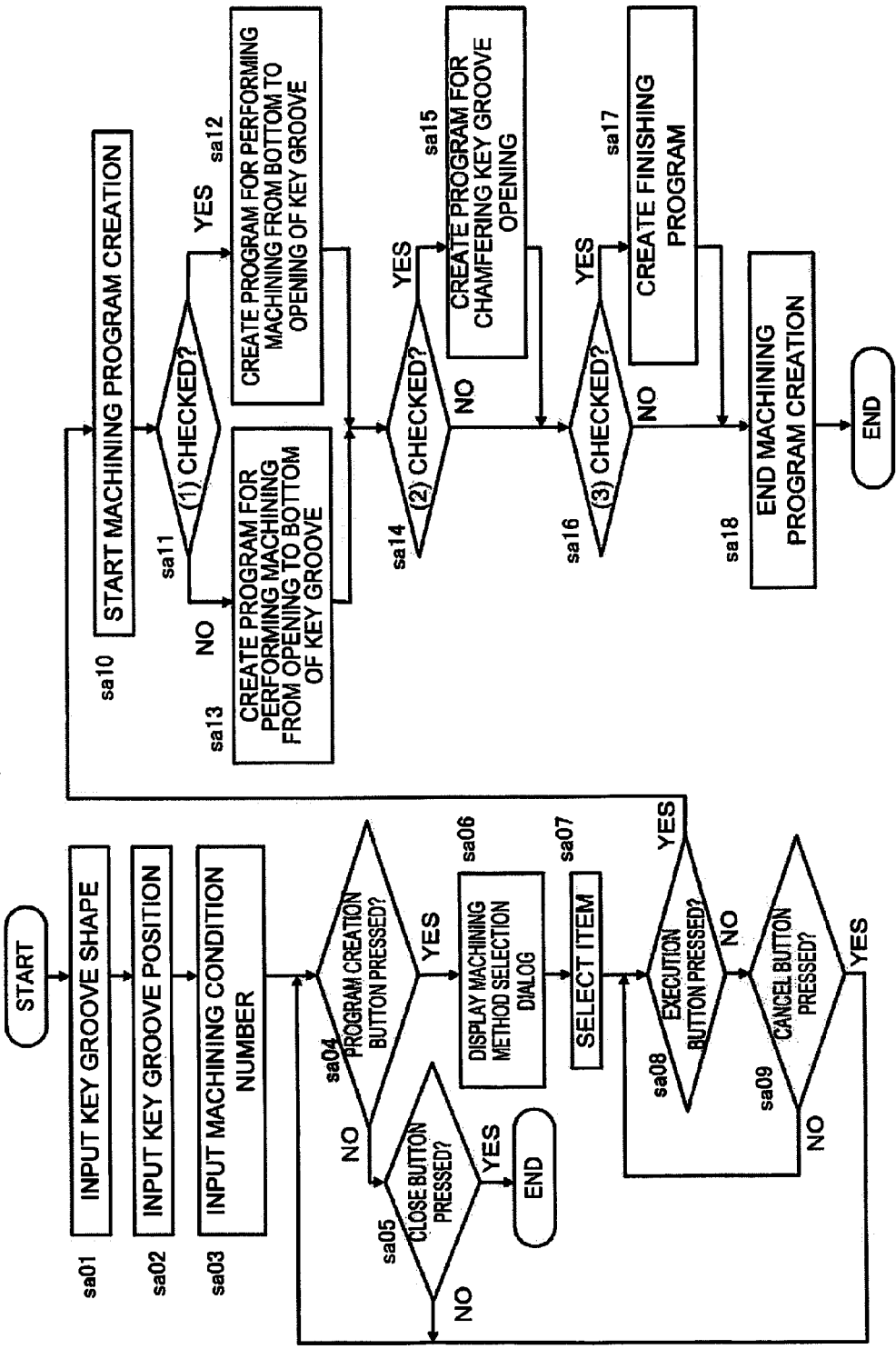
FIG. 8 is a flowchart for executing the machining methods.
Figure 10:
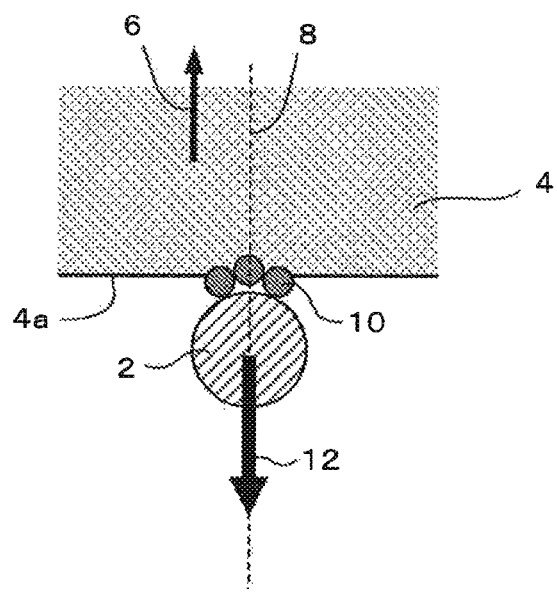
FIG. 10 is a diagram showing a state in which a wire electrode receives a force in an opposite direction of a traveling direction of the wire electrode if a surface to be machined and a machining pass are orthogonal to each other when a workpiece is cut in wire electric discharge machining.
Figure 11:
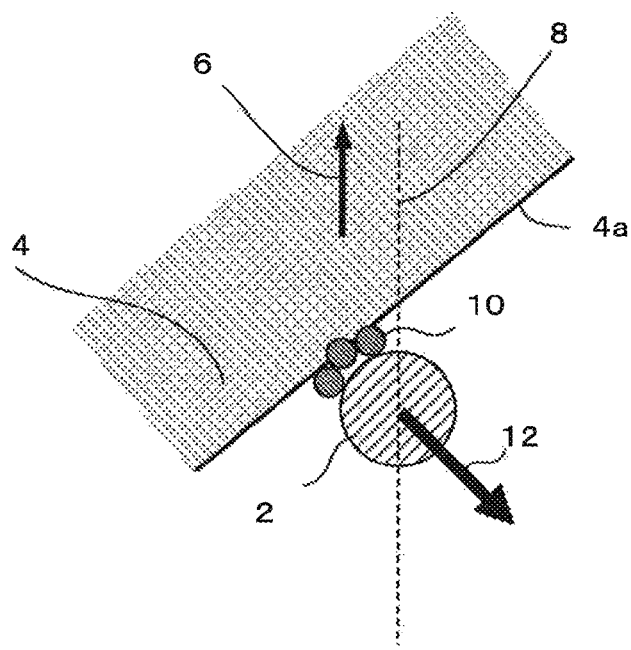
FIG. 11 is a diagram showing a state in which the wire electrode receives a force in the opposite direction of the traveling direction of the wire electrode if the surface to be machined and the machining pass are not orthogonal to each other when the workpiece is cut in wire electric discharge machining.
Figure 12:
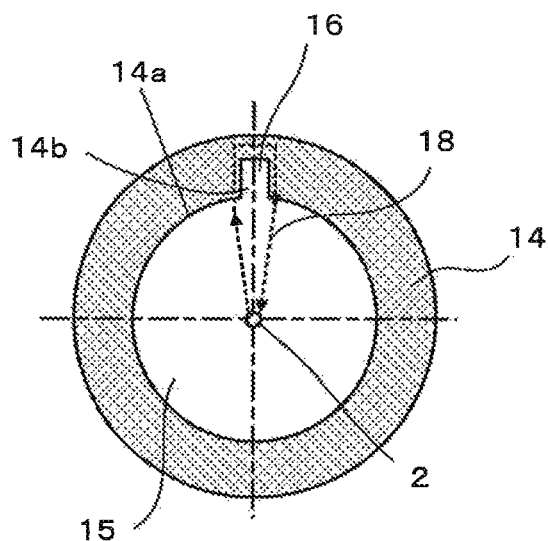
FIG. 12 is a diagram for explaining a conventional machining method for machining a key groove in a round hole.
Figure 13:
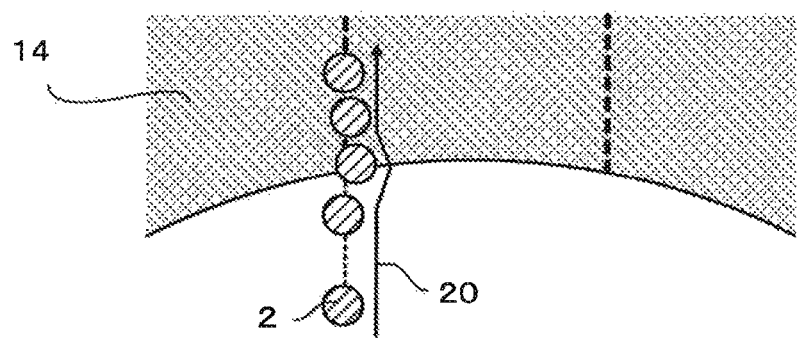
FIG. 13 is a diagram showing a state in which the wire electrode deviates from a wire machining pass if the surface to be machined and the machining pass are not orthogonal to each other.
Figure 14:
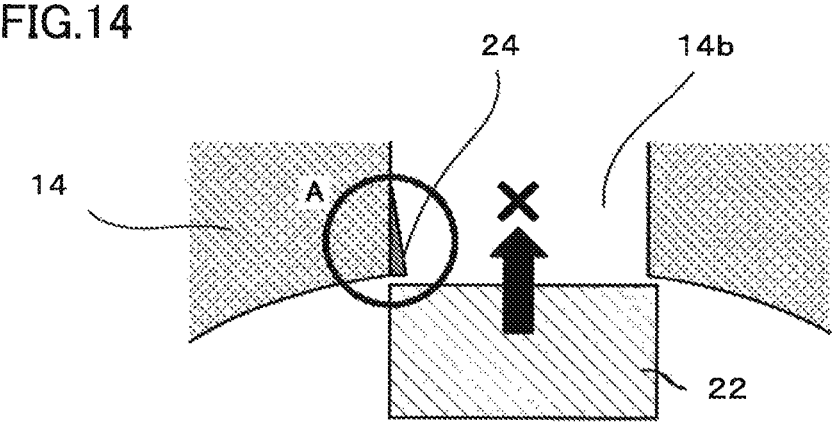
FIG. 14 is a diagram showing a state in which a key cannot be inserted into a machined key groove.

FIG. 8 is a flowchart for executing the machining methods explained above. Note that, in the embodiment, the diameter and the position of the round hole are designated by the input from the keyboard to the display. However, the diameter and the position of the round hole may be designated using a positioning function of the wire electric discharge machine. The machining methods are explained according to steps below.

[Step sa01] Input a key groove shape. That is, acquire data of the key groove shape input by the operator.
[Step sa02] Input a key groove position. That is, acquire data of the key groove position input by the operator.
[Step sa03] Input a machining condition number. That is, acquire the machining condition number input by the operator.
[Step sa04] Determine whether the program creation button is pressed. If the program creation button is pressed (YES), shift to step sa06. If the program creation button is not pressed (NO), shift to step sa05.
[Step sa05] Determine whether the close button is pressed. If the close button is pressed (YES), end processing. If the close button is not pressed (NO), return to step sa04 and continue the processing.
[Step sa06] Display the machining method selection dialog.
[Step sa07] Select an item. That is, acquire data of the selected item.
[Step sa08] Determine whether the execution button is pressed. If the execution button is pressed (YES), shift to step sa10. If the execution button is not pressed (NO), shift to step sa09.
[Step sa09] Determine whether the cancel button is pressed. If the cancel button is pressed (YES), shift to step sa04 and continue the processing. If the cancel button is not pressed (NO), shift to step sa08 and continue the processing.
[Step sa10] Start creation of machining program.
[Step sa11] Check whether (1) is checked. If (1) is checked, shift to step sa12. If (1) is not checked, shift to step sa13.
[Step sa12] Create a program for performing machining from the bottom to the opening of the key groove.
[Step sa13] Create a program for performing machining from the opening to the bottom of the key groove.
[Step sa14] Check whether (2) is checked. If (2) is checked, shift to step sa15. If (2) is not checked, shift to step sa16.
[Step sa15] Create a program for chamfering the key groove opening.
[Step sa16] Check whether (3) is checked. If (3) is checked, shift to step sa17. If (3) is not checked, shift to step sa18.
[Step sa17] Create a finishing program.
[Step sa18] End the creation of the machining program and end the processing.

An embodiment is explained in which a machining pass generating apparatus or software is mounted on a numerical controller mounted on a wire electric discharge machine and a key groove machining program is generated by a macro program. In the numerical controller, when a program conforming to a format shown in FIG. 9A is commanded, a machining pass for key groove machining is generated.

An operator creates and executes a machining program shown in FIG. 9B.

When G123 is commanded, O100 (FIG. 9C) is executed.

Association of G123 and O100 is designated by parameters of the numerical controller 50 in advance. In O100, a machining mode (argument M) designated by G123 is referred to. According to a value of the argument, a program for machining a key groove side surface from a bottom to an opening of a key groove (FIG. 9D), a program for performing machining to chamfer the key groove opening (FIG. 9E), or a program for performing finishing for performing machining, with machining conditions changed, on the same pass again or on a pass shifted in an offset direction of the wire electrode 2 after machining (FIG. 9F) is executed.

When an unspecified machining mode is designated as the argument M, a program for performing machining with a shortest machining distance (FIG. 9G) is executed. In this case, the key groove opening cannot be suppressed from being narrowed.

In the embodiment, the moving pass of the wire electrode 2 created by the machining program or the numerical controller is explained as the machining pass generated by the machining pass generating apparatus. However, the machining pass may be formed as a machining pass diagram for causing the operator to check the machining pass or drawing data or figure data editable by a CAD/CAM apparatus and converted into a machining program by another apparatus such as the CAD/CAM apparatus.

In the wire electric discharge machining using the machining pass generating apparatus, the opening of the machined key groove is machined in dimensions as designated by a drawing or the like. As a result, when the key is inserted into the machined key groove, the key does not fail to enter the key groove. The operator, that is, a person who creates a machining pass, that is, a machining program, does not need to perform special operations for changing a machining pass in order to prevent the key groove opening from being narrowed when a machining pass for key groove machining is generated. The operator can easily generate a machining pass.

The invention claimed is:

1. A machining pass generating apparatus for a wire electric discharge machine configured to generate a machining pass for machining a key groove on a side surface of a round hole,
the machining pass generating apparatus comprising a processor configured to:
define a shape of the key groove to be machined,
designate a diameter of the round hole,
designate a position of the round hole, and
generate a machining pass, the pass suppresses an opening of the key groove from being narrowed.

2. The machining pass generating apparatus for the wire electric discharge machine according to claim 1, wherein the processor is further configured to generate a machining pass for machining side surfaces of the key groove such that, on both the side surfaces, a wire electrode of the wire electric discharge machine moves from a bottom to the opening of the key groove.

3. The machining pass generating apparatus for the wire electric discharge machine according to claim 1, wherein the processor is further configured to generate a chamfered section or a corner R section in the opening of the key groove.

4. The machining pass generating apparatus for the wire electric discharge machine according to claim 1, wherein the processor is further configured to set the machining pass for machining the side surfaces of the key groove in a direction in which a wire electrode of the wire electric discharge machine moves from the opening to the bottom of the key groove and repeatedly generates a pass the same as a pass once machined or repeatedly generates a pass shifted in an offset direction of the wire electrode.

5. A wire electric discharge machine configured to generate a machining pass for machining a key groove on a side surface of a round hole,
the wire electric discharge machine comprising a processor configured to:
define a shape of the key groove to be machined,
designate a diameter of the round hole,
designate a position of the round hole, and
generate a machining pass, the machining pass suppresses an opening of the key groove from being narrowed.

6. The wire electric discharge machine according to claim 5, further comprising a wire electrode,
wherein the processor is further configured to generate a machining pass for machining side surfaces of the key groove such that, on both the side surfaces, the wire electrode moves from a bottom to the opening of the key groove.

7. The wire electric discharge machine according to claim 5, wherein the processor is further configured to generate a chamfered section or a corner R section in the opening of the key groove.

8. The wire electric discharge machine according to claim 5, further comprising a wire electrode,
wherein the processor is further configured to set the machining pass for machining the side surfaces of the key groove in a direction in which the wire electrode moves from the opening to the bottom of the key groove and repeatedly generates a pass the same as a pass once machined or repeatedly generates a pass shifted in an offset direction of the wire electrode.

* * * * *